US012254393B2

(12) United States Patent
Malvankar et al.

(10) Patent No.: US 12,254,393 B2
(45) Date of Patent: Mar. 18, 2025

(54) RISK ASSESSMENT OF A CONTAINER BUILD

(71) Applicant: International Business Machines Corporation, Armonk, NY (US)

(72) Inventors: Abhishek Malvankar, White Plains, NY (US); Carlos A. Fonseca, LaGrangeville, NY (US); Charles E. Beller, Baltimore, MD (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 17/506,017

(22) Filed: Oct. 20, 2021

(65) Prior Publication Data

US 2023/0118939 A1 Apr. 20, 2023

(51) Int. Cl.

| | |
|---|---|
| ***G06N 3/042*** | (2023.01) |
| ***G06F 9/455*** | (2018.01) |
| ***G06F 40/40*** | (2020.01) |
| ***G06N 3/045*** | (2023.01) |

(52) U.S. Cl.

CPC ......... *G06N 3/042* (2023.01); *G06F 9/45558* (2013.01); *G06F 40/40* (2020.01); *G06N 3/045* (2023.01); *G06F 2009/4557* (2013.01); *G06F 2009/45591* (2013.01)

(58) Field of Classification Search

CPC .... G06N 3/042; G06N 3/045; G06F 9/45558; G06F 40/40; G06F 2009/4557; G06F 2009/45591; G06F 8/60; G06F 21/57; G06F 21/577

See application file for complete search history.

(56) References Cited

U.S. PATENT DOCUMENTS

| | | |
|---|---|---|
| 8,011,010 B2 | 8/2011 | Michael |
| 8,839,228 B2 | 9/2014 | Thorat |
| 9,411,965 B2 | 8/2016 | Giakouminakis |

(Continued)

FOREIGN PATENT DOCUMENTS

| | | |
|---|---|---|
| CN | 105069353 | 11/2015 |

OTHER PUBLICATIONS

PCT/EP2022/078216, Patent Cooperation Treaty, International Search Report and Written Opinion, Feb. 2, 2023.

(Continued)

*Primary Examiner* — Kenneth Tang

(74) *Attorney, Agent, or Firm* — IBM Patents+ Team

(57) ABSTRACT

An artificial intelligence (AI) platform to support selective replacement of one or more image layers of a container image build. A metadata file is subject to natural language processing and one or more corresponding vector representations are created and subject to evaluation by a set of artificial neural networks (ANNs). A first ANN assesses each vector representation with respect to compliance and operability, and the second ANN selectively assesses the vector representation(s) with respect to similarity with one or more compliant vector representations. In response to the assignment of the second score, at least one vector representation of the received metadata file is selectively replaced with at least one compliant vector representation. The metadata file is selectively provisioned with the selectively replaced vector representation(s).

18 Claims, 8 Drawing Sheets

(56) References Cited

U.S. PATENT DOCUMENTS

| | | | | |
|---|---|---|---|---|
| 10,841,328 | B2 | 11/2020 | Estes | |
| 11,010,888 | B2 | 5/2021 | Hu | |
| 2013/0298192 | A1 | 11/2013 | Kumar | |
| 2014/0079297 | A1 * | 3/2014 | Tadayon | G06V 40/172<br>382/118 |
| 2016/0364286 | A1 | 12/2016 | Charters | |
| 2016/0381075 | A1 | 12/2016 | Goyal | |
| 2017/0177877 | A1 | 6/2017 | Suarez | |
| 2017/0178038 | A1 | 6/2017 | Guven | |
| 2019/0089737 | A1 * | 3/2019 | Shayevitz | H04L 63/1425 |
| 2019/0156256 | A1 * | 5/2019 | Argyros | G06F 40/30 |
| 2019/0311231 | A1 * | 10/2019 | Sewak | G06F 18/22 |
| 2020/0097662 | A1 * | 3/2020 | Hufsmith | H04L 9/0643 |
| 2020/0234195 | A1 | 7/2020 | Deshpande | |
| 2020/0326990 | A1 | 10/2020 | Staffelbach et al. | |
| 2021/0034708 | A1 * | 2/2021 | Prasad | G06N 3/045 |
| 2021/0136097 | A1 | 5/2021 | McClymont, Jr. | |
| 2022/0229990 | A1 * | 7/2022 | Turkkan | G06F 40/289 |
| 2022/0237383 | A1 * | 7/2022 | Park | G06N 20/00 |
| 2022/0245352 | A1 * | 8/2022 | Nivarthi | G06F 40/216 |
| 2022/0245353 | A1 * | 8/2022 | Turkkan | G06F 40/216 |

OTHER PUBLICATIONS

Gualandi, "ASiMOV: Microservices-Based Verifiable Control Logic with Estimable Detection Delay against Cyber-Attacks to Cyber-Physical Systems." (Diss) (2020).

Tunde-Onadele et al. "A study on container vulnerability exploit detection." 2019 IEEE International Conference on Cloud Engineering (IC2E). IEEE, 2019.

* cited by examiner

```
FROM ubuntu as builder

MAINTAINER Sagar Gulabani sageecute@gmail.com

WORKDIR /app
COPY ./id_rsa /app

RUN apt-get update && \
apt-get -y install git && \
eval ‘ssh-agent -s’ && \
mkdir ~/.ssh/ && \
echo "StrictHostKeyChecking no" >> /etc/ssh/ssh_config && \
cat /etc/ssh/ssh_config && \
chmod go-w /root && \
chmod 700 /root/.ssh && \
chmod 600 /root/.ssh/id_rsa && \
ssh-add ~/.ssh/id_rsa && \
git clone <your-git-repo-ssh-url>

FROM ubuntu as builder1
```

| ID | Command 1 | Command 2 | is_similar |
|---|---|---|---|
| 1 | RUN wget http://ibm.com/get/imagenet | RUN wget http://datasets.com/get/imagenet | 0 |
| 2 | ADD ./sample-tar.gz /tmp | ADD ./sample-tar.gz | 1 |

RISK ASSESSMENT OF A CONTAINER BUILD

BACKGROUND

The present embodiments relate to risk assessment of a container build. More specifically, the embodiments relate to utilizing artificial intelligence to understand image layers and selectively replace one or more image layers of a container image build prior to deploying the container in a runtime environment.

A container is an executable unit of software in which application code is packaged so that it can be run on different computing environments. The container(s) virtualize the operating system so that each individual container contains only the application and its libraries and dependencies. Containers share the machine operating system kernel, thereby eliminating the need for a full operating system instance per application, and further managing a size of the container. When containerizing an application, the process includes packaging an application with its relevant variables, configuration files, libraries, and software dependences. The result is a container image that can be run on a container platform.

A virtual machine (VM) is a virtual representation, or emulation, of a physical computer. Each VM has its own operating system and application, and multiple VMs may be supported on a single physical machine. The VM uses a software layer, referred to as a hypervisor, to coordinate with underlying physical hardware of the physical computer. The hypervisor allocates physical computer resources, such as processors, memory, and storage, to each virtual machine. In addition, the hypervisor maintains separation of VMs from each other to mitigate interference. Accordingly, each VM contains a guest operating system, a virtual copy of the hardware that the operating system requires to run, along with an application and its associated libraries and dependencies.

To satisfy compliance and risk, containers and VMs are validated against a container registry and an image, respectively. Validation of the container(s) and VM(s) occur according to a known set of databases. However, containers and VMs can have different types of software added by a user which may not be present in such databases. For example, a user might rename a layer in the container, build and package a custom library which is added to the container, or add binary artifacts for format unknown to the container registry. Container deployment is an action of pushing containers to their target environment. While a container might hold an entire application, most container deployments are in fact multi-container deployments which push multiple containers to the target environment. Deploying containers from unsecure and non-compliant images to a cloud container runtime with high severity vulnerabilities or non-compliant data handling can result in a security breach or significant monetary fines.

SUMMARY

The embodiments include a system, computer program product, and method for leveraging artificial intelligence to optimize container builds and virtual machine mounts. This Summary is provided to introduce a selection of representative concepts in a simplified form that are further described below in the Detail Description. This Summary is not intended to identify key features or essential features of the claimed subject matter, nor is it intended to be used in any way that would limit the scope of the claimed subject matter.

In one aspect, a computer system is provided with a processing unit operatively coupled to memory, and an artificial intelligence (AI) platform operatively coupled to the processing unit. The AI platform supports selectively replacing one or more image layers of a container or a virtual machine (VM) image. The AI platform includes tools in the form of at least a representation manager and a neural network manager, with the tools configured with functionality to support and enable the replacement. The representation manager is configured to employ natural language processing to convert a received metadata file representing the container or the (VM) image into one or more vector representations. The neural network manager is configured to leverage a first artificial neural network (ANN) to assign a first score to the vector representation(s). In an embodiment, the first score assignment includes the first ANN measuring a distance between a stored vector representation and the one or more vector representations of the received metadata file, with the first score assignment being based, as least in part, on the measured distance. The first score conveys a compliance factor that corresponds to operability of the corresponding vector representation. In response to the assignment of the first score, the neural network manager selectively leverages a second ANN configured to assign a second score to the vector representation of the received metadata file. The second score corresponding to a similarity factor with one or more compliant vector representations. In response to the assignment of the second score, the neural network manager selectively replaces the vector representation(s) of the received metadata file with at least one of the compliant vector representations. The processor selectively provisions the container or the VM image with the selectively replaced one or more vector representations.

In another aspect, a computer program product is provided to support selective replacement of one or more image layers of a container of VM image build. The computer program product includes a computer readable storage medium having program code embodied therewith. Program code, which is executable by a processor, is provided to support and enable the selective layer replacement. More specifically, the program code employs natural language processing to convert a received metadata file representing a container or VM image into one or more vector representations. Program code is provided to leverage a first artificial neural network (ANN) to assign a first score to each vector representation. In an embodiment, the first score assignment includes the first ANN measuring a distance between a stored vector representation and the one or more vector representations of the received metadata file, with the first score assignment being based, as least in part, on the measured distance. The first score conveys a compliance factor that corresponds to operability of the corresponding vector representation. In response to the assignment of the first score, the program code selectively leverages a second ANN configured to assign a second score to the vector representation of the received metadata file. The second score corresponds to a similarity factor with one or more compliant vector representations. In response to the assignment of the second score, the program code selectively replaces at least one of the vector representations of the received metadata file with at least one of the compliant vector representations, and the container or VM image is selectively provisioned with the selectively replaced one or more vector representations.

In yet another aspect, a method is provided to support selective replacement of one or more image layers of a container of VM image build. The method includes employing natural language processing to convert a received metadata file representing a container or virtual machine (VM) image into one or more vector representations. A first artificial neural network (ANN) is leveraged to assign a first score to each vector representation. In an embodiment, the first score assignment includes the first ANN measuring a distance between a stored vector representation and the one or more vector representations of the received metadata file, with the first score assignment being based, as least in part, on the measured distance. The first score conveys a compliance factor that corresponds to operability of the corresponding vector representation. In response to the assignment of the first score, a second ANN is leveraged and configured to assign a second score to the vector representation of the received metadata file. The second score corresponds to a similarity factor with one or more compliant vector representations. In response to the assignment of the second score, at least one of the vector representations of the received metadata file is selectively replaced with at least one of the compliant vector representations. The container or the VM image is selectively provisioned with the selectively replaced one or more vector representations.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

FIG. 4 depicts a sample container build file illustrating a non-compliant metadata file.

FIG. 5 depicts a block diagram illustrating sample commands in the form of executable layers of program code, and corresponding similar commands.

DETAILED DESCRIPTION

Figure 1:
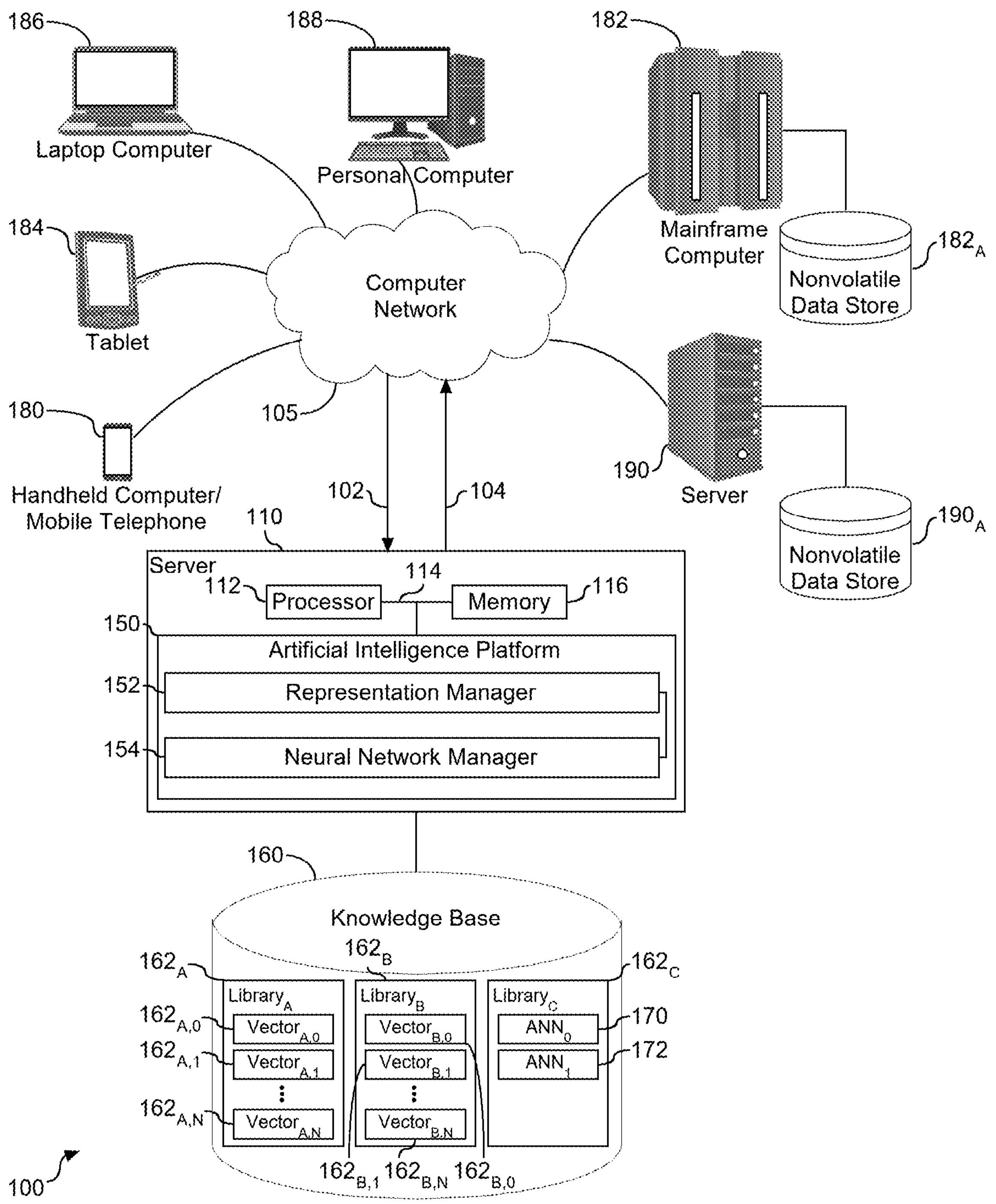
FIG. 1 depicts a schematic diagram of a computer system with tools to support and enable selectively swapping one or more layers in a metadata file in view of a risk assessment.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of AI computer systems, natural language processing (NLP) systems process natural language based on acquired knowledge. NLP is a field of AI that functions as a translation platform between computer and human languages. More specifically, NLP enables computers to analyze and understand human language. Natural Language Understanding (NLU) is directed at parsing and translating input according to natural language principles. Examples of such NLP systems are the IBM Watson® artificial intelligent computer system and other natural language question answering systems.

Machine learning (ML), which is a subset of AI, utilizes algorithms to learn from data and create foresights based on the data. ML is the application of AI through creation of models, for example, artificial neural networks that can demonstrate learning behavior by performing tasks that are not explicitly programmed. There are different types of ML including learning problems, such as supervised, unsupervised, and reinforcement learning, hybrid learning problems, such as semi-supervised, self-supervised, and multi-instance learning, statistical inference, such as inductive, deductive, and transductive learning, and learning techniques, such as multi-task, active, online, transfer, and ensemble learning.

Artificial neural networks (ANNs) are models of the way the nervous system operates. Basic units are referred to as neurons, which are typically organized into layers. The ANN works by simulating a large number of interconnected processing units that resemble abstract versions of neurons. There are typically three parts in an ANN, including an input layer, with units representing input fields, one or more hidden layers, and an output layer, with a unit or units representing target field(s). The units are connected with varying connection strengths or weights. Input data is presented to the first layer, and values are propagated from each neuron to neurons in the next layer. At a basic level, each layer of the neural network includes one or more operators or functions operatively coupled to output and input. The outputs of evaluating the activation functions of each neuron with provided inputs are referred to herein as activations. Complex neural networks are designed to emulate how the human brain works, so computers can be trained to support poorly defined abstractions and problems where training data is available.

A container image is a file that includes source code to run an isolated process. More specifically, the container image is a file comprised of multiple layers which can execute applications in a single instance. A container file is a text document that contains commands and arguments to build the container image. The container is a run-time instance of the container image(s). A container repository is used to store related container images. In an exemplary embodiment, container repositories can be used to manage, pull, or push, container images. A container registry stores multiple repositories of container images, as well as storing application program interface (API) paths and access control rules. However, container registries do not have the ability to scan custom source code and application artifacts. An application artifact is known in the art as a tangible by-product produced during development of software. Examples of an application artifact include, but are not limited to, application source code, testing code, application programming interface (API) specifications, application configurations, deployment scripts, and variables. The application artifacts require specific computer hardware needed to run the associated workload. In an exemplary embodiment, the specific or necessary computer hardware to support the application artifacts are referred to as a framework or hardware framework, and may include elements such as random access memory (RAM), central processing unit (CPU), graphics processing unit (GPU), etc. The computer hardware elements shown and described herein are for exemplary purposes and should not be considered limiting.

As shown and described, a computer system, program product, and method are provided for utilizing AI and ML to conduct an assessment of layers of a container file and selectively replace or swap layers prior to deploying the container. In an embodiment, the layers are also referred to as lines of executable program code. Similarly, in an embodiment the assessment and selective replacement or swap is extended to one or more virtual machines (VMs) prior to deploying the virtual machine(s).

Referring to FIG. 1, a schematic diagram of a computer system (100) is provided with tools to support selectively swapping one or more layers in a metadata file in view of a risk assessment. As shown, a server (110) is provided in communication with a plurality of computing devices (180), (182), (184), (186), (188), and (190) across a network connection (105). The server (110) is configured with a processor (112) in communication with memory (116) across a bus (114). The server (110) is shown with an artificial intelligence (AI) platform (150) to support risk assessment of a container file. More specifically, the AI platform (150) is configured with one or more tools to leverage an artificial neural network for provisioning containers and virtual machines. The computing devices (180), (182), (184), (186), (188), and (190) communicate with each other and with other devices or components via one or more wired and/or wireless data communication links, such as network (105), where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The artificial intelligence (AI) platform (150) is shown herein configured to receive input (102) from various sources. For example, the AI platform (150) may receive input across the network (105) and leverage a knowledge base (160), also referred to herein as a corpus or data source, to support risk assessment and swapping of layers prior to provisioning a container or a virtual machine. As shown by way of example, the knowledge base (160) is configured with two libraries, shown herein as library$_A$ (162$_A$) and library$_B$ (162$_B$). Although two libraries are shown, the quantity should not be considered limiting. For example, the container library (162$_A$) may be in the form of two separate libraries, with a first of these libraries populated with representations of compliant container build layers and a second of these libraries populated with representations of non-compliant container build layers. With respect the container environment, the libraries are populated with vector representations corresponding to container builds. In the example shown herein, library$_A$ (162$_A$) populated with vector representations corresponding to layers in a container build and library$_B$ (162$_B$) is populated with vector representations corresponding to layers in a virtual machine (VM) image. In an embodiment, each individual vector representation corresponds to a layer, e.g. line of program code instructions, in the corresponding metadata file of the container or VM image subject to risk assessment. In an exemplary embodiment, whether a vector representation is compliant or non-compliant is subject to an assessment based on an identifier attached to or otherwise associated the vector representation. The vector representations are layers of executable program code in the container build(s) or VM image build(s) represented in vector form. As shown herein, library$_A$ (162$_A$) is populated with data in the form of vector representations, shown herein by way of example as vector$_{A,0}$ (162$_{A,0}$), vector$_{A,1}$ (162$_{A,1}$), and vector$_{A,N}$ (162$_{A,N}$). Library$_B$ (162$_B$) is populated with vector representations of one or more VM images, shown herein by way of example as vector$_{B,0}$ (162$_{B,0}$), vector$_{B,1}$ (162$_{B,1}$), and vector$_{B,N}$ (162$_{B,N}$). The quantity of vectors (162$_{A,0}$), (162$_{A,1}$), (162$_{A,N}$), (162$_{B,1}$), (162$_{B,2}$), and (162$_{B,N}$) shown herein is for illustrative purposes and should not be considered limiting. Accordingly, as shown herein the vector representations may individually represent compliant or non-compliant vector representations of layers of container builds or VM images.

The AI platform (150) is shown herein with several tools to support leveraging one or more neural networks to provide risk assessment with respect to provisioning of containers and virtual machines. The AI platform (150) tools are shown herein as a representation manager (152) and a neural network (NN) manager (154). The tools (152) and (154) are operatively coupled, directly or indirectly, together, and provide the functions, as described below.

The representation manager (152) functions to provision either a virtual machine (VM) image or a container file, also referred to herein as a metadata file. The aspect of provisioning is directed to support compliance and security by selectively identifying and replacing layers of the metadata file, and mounting the corresponding VM or a container image build. The representation manager (152) applies a filter to the metadata file to effectively remove pre-approved or non-functional segmented elements from the second part of the analysis. For example, in an exemplary embodiment, comments and known dependencies, such as pre-approved libraries, are identified by the filter and are effectively removed from further analysis of the container file. In an embodiment, the filter may be utilized or a part of software code to identify elements within the container file that are subject to removal. In an exemplary embodiment, application of the filter to the metadata file is referred to as noise removal, and in an embodiment, the representation manager (152) applies the filter to the metadata file prior to conversion of layers of the file to one or more vector representations. After application of the filter, the processed metadata file is comprised of container or VM layers of executable code. The representation manager (152) further functions to convert the layers in the metadata file that remain after the filtering, i.e., the layer(s) of executable code, into one or more vector representations. In an embodiment, the representation manager (152) functions to convert each layer of the corresponding container file or VM image into a vector representation and stores the vector representation(s) in an appropriately designated location or library in the knowledge base (160). For example, with respect to the container file, the container vector representation(s) is stored in $library_A$ ($162_A$), and with respect to a VM image, the VM image vector representation(s) is stored in $library_B$ ($162_B$). Accordingly, the representation manager (152) is configured to convert one or more layers of code in the metadata file into one or more vector representations and to store each vector representation in a corresponding library.

The neural network (NN) manager (154) is shown herein operatively coupled to the representation manager (152). The NN manager (154) functions to subject the vector representations of the metadata file to analysis by two artificial neural networks (ANNs), also referred to herein as a first ANN, shown herein as $ANN_0$ (170), and a second ANN, shown herein as $ANN_1$ (172). The first ANN, $ANN_0$ (170), and the second ANN, $ANN_1$ (172), are operatively coupled to the AI platform (150). In an embodiment, the knowledge base (160) is configured with a third library, shown herein as $library_C$ ($162_C$) to receive and store the first and second ANNs, (170) and (172), respectively. Aspects of the first ANN, $ANN_0$ (170), are discussed in greater detail in FIG. 3. The NN manager (154) leverages the first ANN, $ANN_0$ (170), to perform a compliance analysis of the vector representations with respect to compliant representations in an appropriate library of the knowledge base (160), i.e. $library_A$ ($162_A$) for container layer representations and $library_B$ ($162_B$) for VM image representations. In an embodiment, the repository includes vector representations of compliant, and in an embodiment, non-compliant layers of program code. In an exemplary embodiment and using the vector representations, the analysis by the NN manger (154) and output of the first ANN, $ANN_0$ (170), is a vector analysis between the metadata file representations and the vectors stored in one or more of the libraries, e.g. $library_A$ ($162_A$) and $library_B$ ($162_B$), including stored vectors identified as compliant and non-compliant. The NN manager (154) conducts a distance measurement between the metadata file representations and the stored vector representation(s). In an embodiment, the distance measure, which is referred to herein as a first score is a Euclidean distance. The NN manager (154) assigns a compliance score corresponding to the operability of the vector representations of the metadata file.

The NN manager (154) identifies and returns a vector from the appropriate repository, e.g. $library_A$ ($162_A$) or $library_B$ ($162_B$). With respect to a container file, the NN manager (154) returns a vector from $library_A$ ($162_A$) that is closest to the container file vector representation that is the subject to the analysis, and with respect to a VM image, the NN manager (154) returns a vector from $library_B$ ($162_B$) that is closest to the VM image vector representation that is the subject of the analysis. The identified vector may be previously designated as compliant or non-compliant, either by the library in which it is populated or via a corresponding identifier. In an embodiment, the analyzed metadata file is added to the repository (160) by the representation manager (152) after the assessment by the NN manager (154), with the layers of the file individually identified as compliant or non-compliant. Accordingly, the NN manager (154) conducts an assessment and identifies a vector from the repository closest to the container file or VM image vector representation that is the subject of the analysis.

Output from the first ANN controls the direction of the metadata file provisioning. More specifically, the first ANN provides output indicating that the vector representations of the metadata file are either compliant or non-compliant with respect to representations of layers of code in the repository, which in an embodiment are vector or vector forms of layers of metadata files. Responsive to the identified vector being designated as non-compliant, the NN manager (154) leverages the second ANN, $ANN_1$ (172), to identify a compliant vector representation that is closest to the metadata file vector representation to mitigate or avoid an error associated with the non-compliant vector identification. The NN manager (154) assigns a similarity score to each vector representation from the metadata file based on the closest identified compliant vector representation. The NN manager (154) leverages the second ANN, $ANN_1$ (172) to perform a distance assessment, referred to herein as a second distance assessment. This second assessment ascertains whether the measured distance between each metadata file vector representation and the stored and identified compliant vector is below a distance threshold. The distance threshold is a similarity threshold wherein the measured distance between two vectors is below the threshold is an indication that the vectors are similar or within a similarity range. If the distance measure of the selected vector is below the distance threshold, the NN manager (154) determines that identified compliant vector is deemed or considered similar. Accordingly, as shown herein, the NN manager (154) facilitates processing of the container file or VM image representation(s) to ascertain that the metadata file layer is compliant based on a distance measurement to a closely represented vector from the repository. If it is determined that the metadata file vector representation is non-compliant, the NN manager (154) searches the appropriate library, e.g. $library_A$ ($162_A$) or $library_B$ ($162_B$), to identify a compliant vector representation that is close to the container file or VM image, respectively, and assess proximity of the subject vector representation to the closest complaint vector representation in the repository (160).

The NN manager (154) leverages the vector proximity assessment to selectively, and in an embodiment individually, replace one or more vector representations in the container file or VM image with an identified close compliant vector representation stored in the repository (160). In an exemplary embodiment, the replacement shown and described herein may be based on individual layers of the container file or VM image, so that individual layers of executable code are subject to replacement, i.e. swapped with identified individual compliance layers of executable code. Similarly, the vector replacement is selective in view of the proximity assessment and compatibility of the replacement vector to support the functionality of the container file or VM image. Once the assessment and selective replacement is complete, the processor (112) selectively provisions the container file or VM image that contains the selectively replaced layers with appropriately identified vector representation(s) in the knowledge base (160).

Although shown as being embodied in or integrated with the server (110), the AI platform (150) may be implemented in a separate computing system (e.g., 190) that is connected across the network (105) to the server (110). Similarly, although shown local to the server (110), the tools (152) and (154) may be collectively or individually distributed across the network (105). Wherever embodied, the representation manager (152) and the NN manager (154) are utilized to leverage first and second ANNs, (170) and (172), respectively, to assess container files and VM images with respect to compliance of executable code, and to selectively replace individual layers of the subject container file or VM image prior to provisioning the container file or VM image.

In some illustrative embodiments, server (110) may be the IBM Watson® system available from International Business Machines Corporation of Armonk, New York, which is augmented with the mechanisms of the illustrative embodiments described hereafter. The representation manager (152) and the NN manager (154), hereinafter referred to collectively as AI tools, are shown as being embodied in or integrated within the AI platform (150) of the server (110). In one embodiment, the AI tools may be implemented in a separate computing system (e.g., 190) that is connected across network (105) to the server (110). Wherever embodied, the AI tools function to risk assessment of a container build.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($\mathbf{190}_A$), and mainframe computer (182) utilizes nonvolatile data store (182*a*). The nonvolatile data store ($\mathbf{182}_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
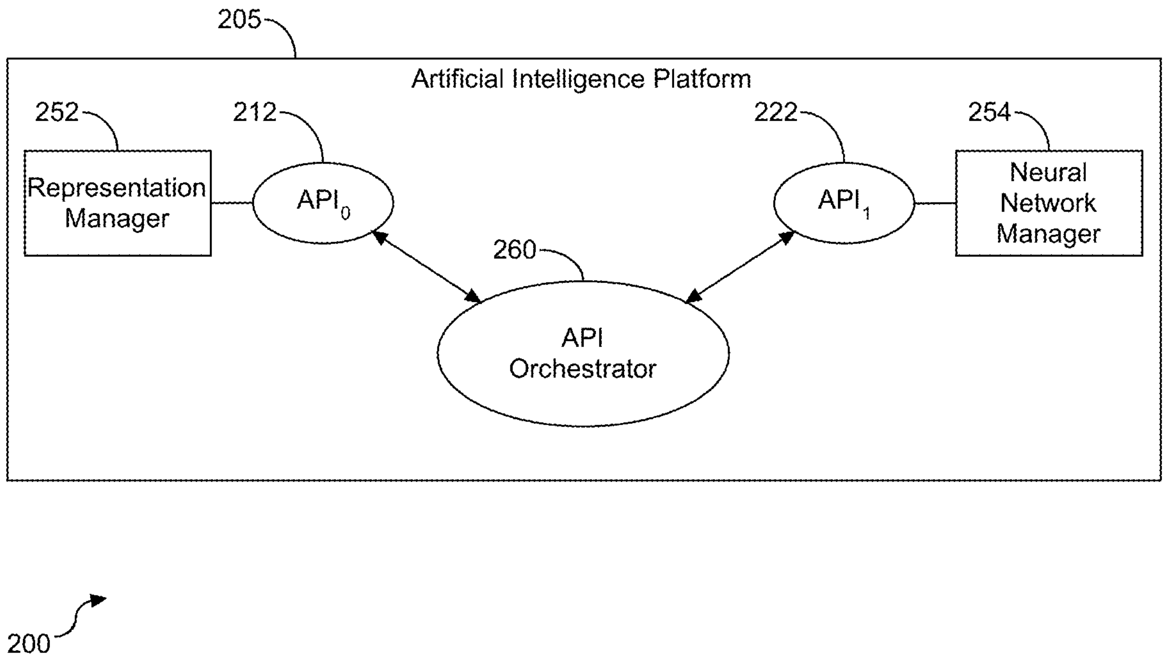
FIG. 2 depicts a block diagram illustrating the AI platform tools, as shown and described in FIG. 1, and their associated application program interfaces (APIs).

An Application Program Interface (API) is understood in the art as a software intermediary between two or more applications. With respect to the artificial intelligence platform (150) shown and described in FIG. 1, one or more APIs may be utilized to support one or more of the tools (152) and (154) and their associated functionality. Referring to FIG. 2, a block diagram (200) is provided illustrating the tools (152) and (154) and their associated APIs. As shown, a plurality of tools are embedded within the artificial intelligence platform (205), with the tools including the representation manager (252) associated with $API_0$ (212) and the NN manager (254) associated with $API_1$ (222). Each of the APIs may be implemented in one or more languages and interface specifications.

As shown, $API_0$ (212) provides functional support to receive a metadata file, such as a container file or a VM image file, and to convert the received metadata file that remains after filtering into one or more vector representations. $API_1$ (222) provides functional support to subject the vector representations of the metadata file to analysis by the first ANN for a first level compliance assessment, and selectively invoking the second ANN configured to generate a second score directed at a similarity characteristics on the layer subject to analysis in view of one or more compliant vector representations. In an exemplary embodiment, $API_1$ (222) leverages the second score to selectively replace identified layer(s) of the container file or VM image file. As shown, each of the APIs (212) and (222) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
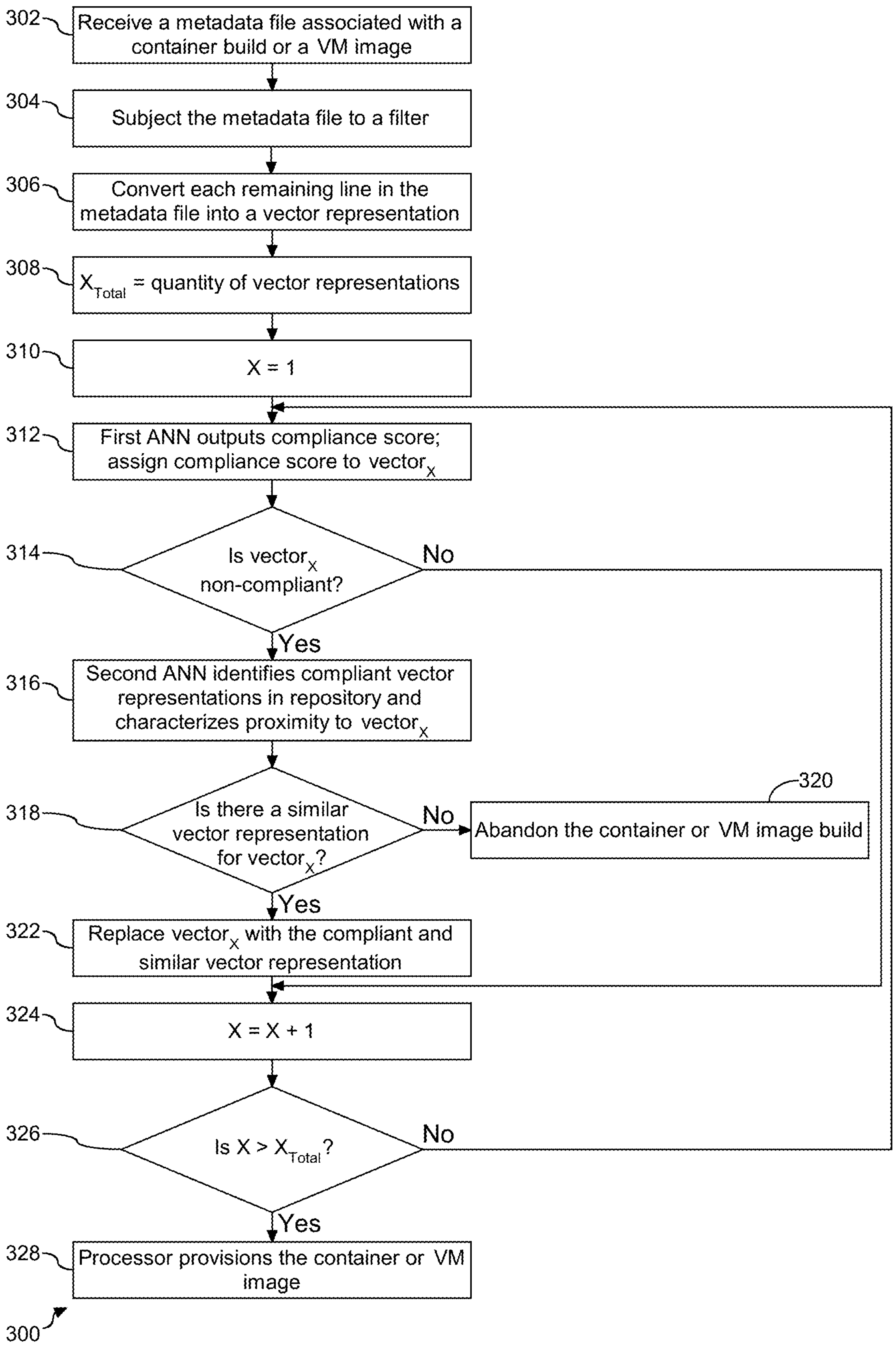
FIG. 3 depicts a flow chart illustrating a process for leveraging AI for a risk assessment associated with provisioning a container file or a VM image.

Referring to FIG. 3, a flow chart (300) is provided to illustrate a process for leveraging AI for a risk assessment associated with provisioning a container file or a VM image. As shown and described herein, the subject container file or VM image, hereinafter referred to the file, are subject to analysis by one or more ANNs of both program code and metadata of a corresponding metadata file using natural language processing (NLP). As described herein, individual layers of the file may be subject to replacement, e.g. swapping, so that individual non-compliant layers of code in the file are replaced with compliant layers prior to provisioning the file. As shown, a metadata file is received or otherwise ascertained (302). The received metadata file may be either a container file associated with a container image build, or a virtual machine (VM) image file. Following receipt of the metadata file, the metadata file is subjected to a filter to identify and effectively remove pre-approved or non-functional segmented elements from the analysis (304). For example, in an exemplary embodiment, comments and known dependencies, such as pre-approved libraries, are identified by the filter or filtering process at step (304), and effectively removed from further analysis of the container file. Following step (304), each line of the metadata file that remains after filtering is subject to NLP and converted into a vector representation (306). As shown in FIG. 1, the representation manager (152) is utilized for the conversion of the layers into vectors. The vector representation of each line of the metadata file can be stored in a repository, such as the knowledge base (160). In an embodiment, the repository stores both compliant and non-compliant vector representations of metadata file lines. In an exemplary embodiment and as shown by way of example in FIG. 5, an identifier is assigned to each of the vector representations in the repository, with a first identifier assignment to indicate a complaint vector representation and a second identifier assignment to indicate a non-compliant representation. Similarly, in an embodiment, the repository is populated with libraries or data structures, with vector representations assigned to a corresponding library or data structure based on the indication of a compliant or non-compliant representation. The variable $X_{Total}$ is assigned to the total number of vector representations, e.g. layers remaining in the metadata file after application of the filter or filtering process, (308), and an associated layer counting variable, X, is initialized (310). Accordingly, a received metadata file is subject to a filter, and the layer(s) remaining after the filter of the metadata file is converted into one or more corresponding a vector representations.

The vector representation of the individual file layers, $vector_X$, is subject to analysis by an artificial neural network (ANN), also referred to herein as the first ANN or $ANN_0$, which generates output in the form of a compliance score and assigns the output to $vector_X$ (312). It is understood in the art that the first ANN is subject to training on data. In an embodiment, the first ANN is trained on the vector representations in the repository. The first ANN analysis is directed at a compliance analysis of the input vector representation, $vector_X$, to existing compliant vectors in the repository. The analysis by the first ANN compares the received vector representations of each line in the metadata file to the compliant vector representations in the repository, and assigns a compliance score to the received vector representation(s) based on the analysis.

As shown and described above, the assignment of a compliance score at step (312) includes a vector analysis by the first ANN between the metadata file vector representation and compliant vectors, or in an embodiment non-compliant vectors, stored in the repository. In an exemplary embodiment, the analysis at step (312) includes a cosine similarity measurement between two vectors. Similarly, in an embodiment, the analysis at step (312) includes an assessment of a distance measure between two vectors, which in an embodiment is a Euclidean distance. Following the assignment of a compliance score to $vector_X$ at step (312), a determination is made whether $vector_X$ is non-compliant (314). In an embodiment, the compliance score of $vector_X$ is compared to a compliance score threshold, wherein the compliance score threshold represents a level of risk assessment for the file layer related to the vector representation. Similarly, in an embodiment, the determination at step (314) may be inverted to assess for compliance. Accordingly, a compliance analysis is conducted by the first ANN on $vector_X$ and a compliance score that corresponds to operability of the file layer is assigned to the vector representation.

A positive response to the determination at step (314) indicates that the layer, e.g. line of program code, in the metadata file represented by $vector_X$ does not satisfy risk or compliance criteria and a second ANN is leveraged or otherwise invoked to identify one or more compliant vector representation(s) stored in the repository that are similar to $vector_X$ and to assign a similarity score to $vector_X$ to characterize the closeness or proximity of the identified compliant vector representation(s) with respect $vector_X$ (316). The similarity score characterizes similarity between $vector_X$ and the identified compliant vector representation(s) that is similar to $vector_X$ in the repository. Similar to the assignment of the compliance score, in an exemplary embodiment, the analysis at step (316) includes a cosine similarity measurement between two vectors. Part of the analysis at step (316) is assessing a distance measurement between two vectors, which in an embodiment is a Euclidean distance. The assigned similarity score of $vector_X$ is compared to a similarity threshold to determine whether the identified compliant vector representation is similar enough to replace $vector_X$ is in the container file or VM image (318). A negative determination indicates that that the identified vector representation(s) is not similar to $vector_X$ and that there is no similar compliant vector representation stored in the repository that could be used to replace the non-compliant $vector_X$ and the container file or VM image build is abandoned (320). A positive response to the determination at step (318) indicates that the identified compliant vector representation(s) is similar to $vector_X$ and the identified compliant vector representation that is identified as the closest is used to replace $vector_X$ (322). The replacement includes removing the layer of program code in the metadata file associated with $vector_X$ and adding or inserting the layer of code that is associated with the compliant similar vector representation from the repository in place of the removed layer. Following either step (322) or a negative response to the compliance determination at step (314), the counting variable, X, is incremented (324) and a determination is made whether each layer representation from the metadata file has been analyzed (326). A negative response indicates that all of the vector representations have not been analyzed and the process returns to step (312). Responsive to a positive determination at step (326), the processor provisions the container or the VM image (328). Accordingly, a similarity assessment is performed on $vector_X$ and a determination is made whether a similar compliant vector representation is stored in the repository.

Referring to FIG. 4, a sample container build file (400) is provided illustrating a non-compliant metadata file. As shown and described, a container build file (410) is provided. Natural language processing (NLP) is applied to analyze the container build file. As shown and described in FIG. 3, the initial analysis is conducted by segmenting and filtering the container build file. In the example file shown herein, the segmentation and filtering identifies private keys to access data (420) in the container build file. As shown and described in FIG. 3, the first ANN functions as a first level of assessment to ensure that the container or VM file has at least a minimum level of compliance. Identification of non-compliance may arise in different forms, such as, but not limited to, commands that call to download uncertified data, commands that run custom built non-certified libraries, commands that share a private key, commands that require non-reproducible builds regarding dependencies, commands that layer caching, etc., in the container build file. With respect to the example container build file (410), the presence of private keys in the container build file results in a classification of the file as non-compliant since access to the data is restricted by the private keys. The issue associated with the detection of the private key is that it is an extra layer of authentication required, so it is not viable for the container build. Accordingly, segmentation and filtering is applied to the container file to assess the file compliance.

It is understood in the art, that training and test data are leveraged to train an ANN. A training dataset may be in the form of a file containing approved commands or in an embodiment a file containing unapproved commands. Referring to FIG. 5, a block diagram (500) is provided to illustrate sample commands in the form of executable layers of program code, and corresponding similar commands. As shown, there are four fields for each command, including an identifier (510), a first command field (520), a second command field (530), and a similarity field (540). The identifier field (520) assigns a numeric or alphanumeric character or character set to the command. The first command field (520) is an entry space for the layer of code subject to assessment. The second command field (530) is an entry space for an identified similar annotation or layer. The similarity field (540) is an entry space to receive a flag indicating compliance or non-compliance between the entries in the first and second command field. In an embodiment, the flag is a bit. As shown in this example, there are two sample layers from a container file, including a first layer shown at (522), represented by an identifier shown at (512), an identified similar layer shown at (532), and a first flag shown at (542). In an embodiment, the flag bit 0 corresponds to compliant, and the flag bit 1 corresponds to non-compliant, although the bit assignments may be inverted. As further shown in this example, a second layer is shown at (524), represented by an identifier shown at (514), an identified similar layer shown at (524), and a second flag shown at (544). Accordingly, in this example, the first layer (522) may be replaced, e.g. swapped, by the identified similar layer (532), and the second layer (524) may not be replaced by the identified layer (534). The entries shown and described herein may be leveraged to train the first and second ANNs to learn a similarity space for container and VM image files and their corresponding commands. The training may be unsupervised based on character and token overlap, or in an embodiment supervised using annotations from previous iterations to learn a similarity model and generate scores from that model.

Aspects of optimizing one or more layers of the container file or VM image shown and described in FIGS. 1-5 are directed at satisfying enterprise compliance, and in an embodiment are directed at satisfying security protocols. It is understood in the art that compliance standard and security requirements are fluid and subject to change. The compliance optimization us shown and described with the tools and APIs shown in FIGS. 1 and 2, respectively, and the processes shown in FIGS. 3, and 4. Aspects of the functional tools (152) and (154) and their associated functionality may be embodied in a computer system/server in a single location, or in one embodiment, may be configured in a cloud-based system sharing computing resources. With references to FIG. 6, a block diagram (600) is provided illustrating an example of a computer system/server (602), hereinafter referred to as a host (602) in communication with a cloud-based support system, to implement the processes described above with respect to FIGS. 3 and 4. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
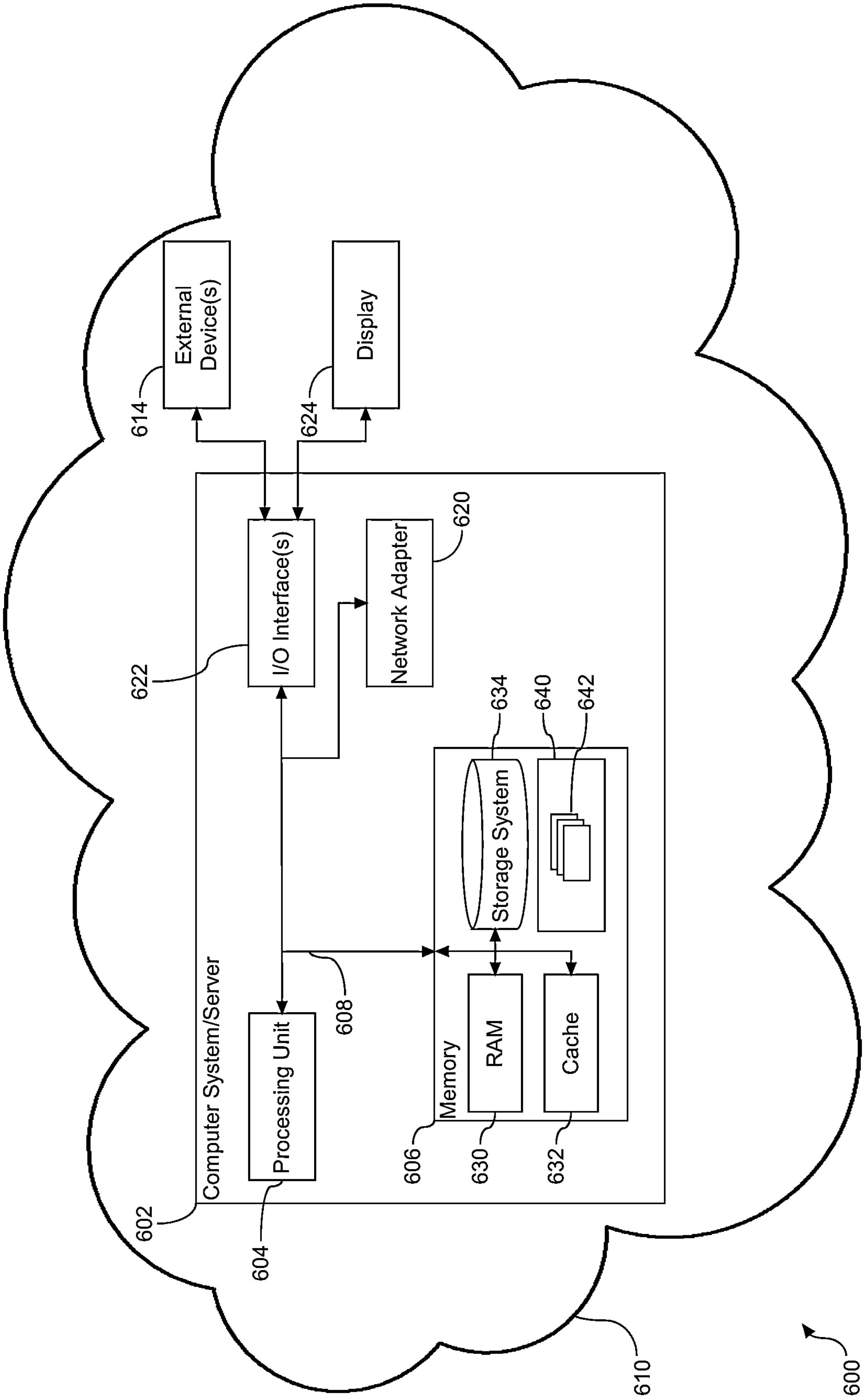
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processing unit (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to assess and manage compliance provisioning directed at mounting of containers and virtual machines in a distributed shared resource environment. For example, the set of program modules (642) may include the tools (152) and (154) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
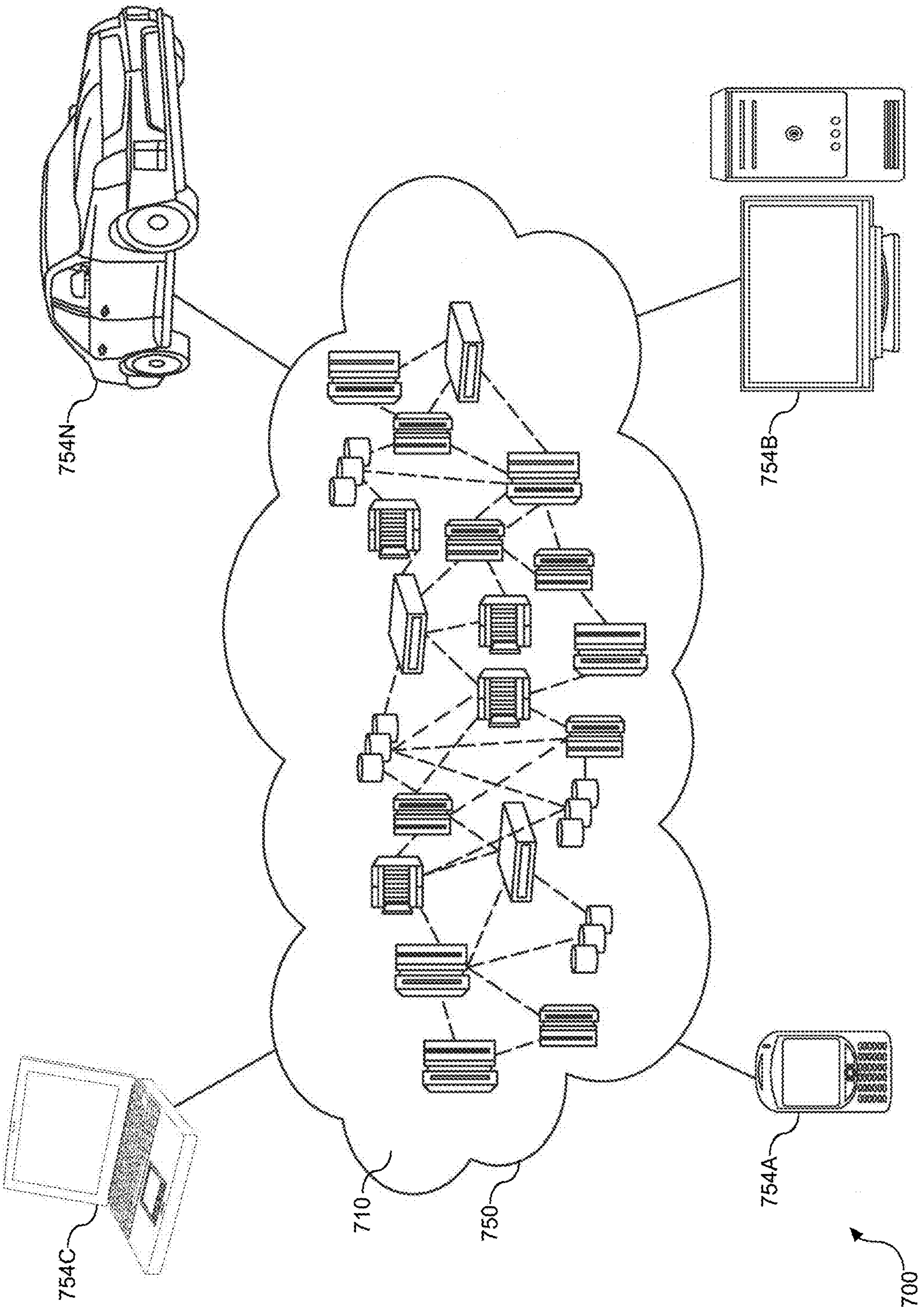
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
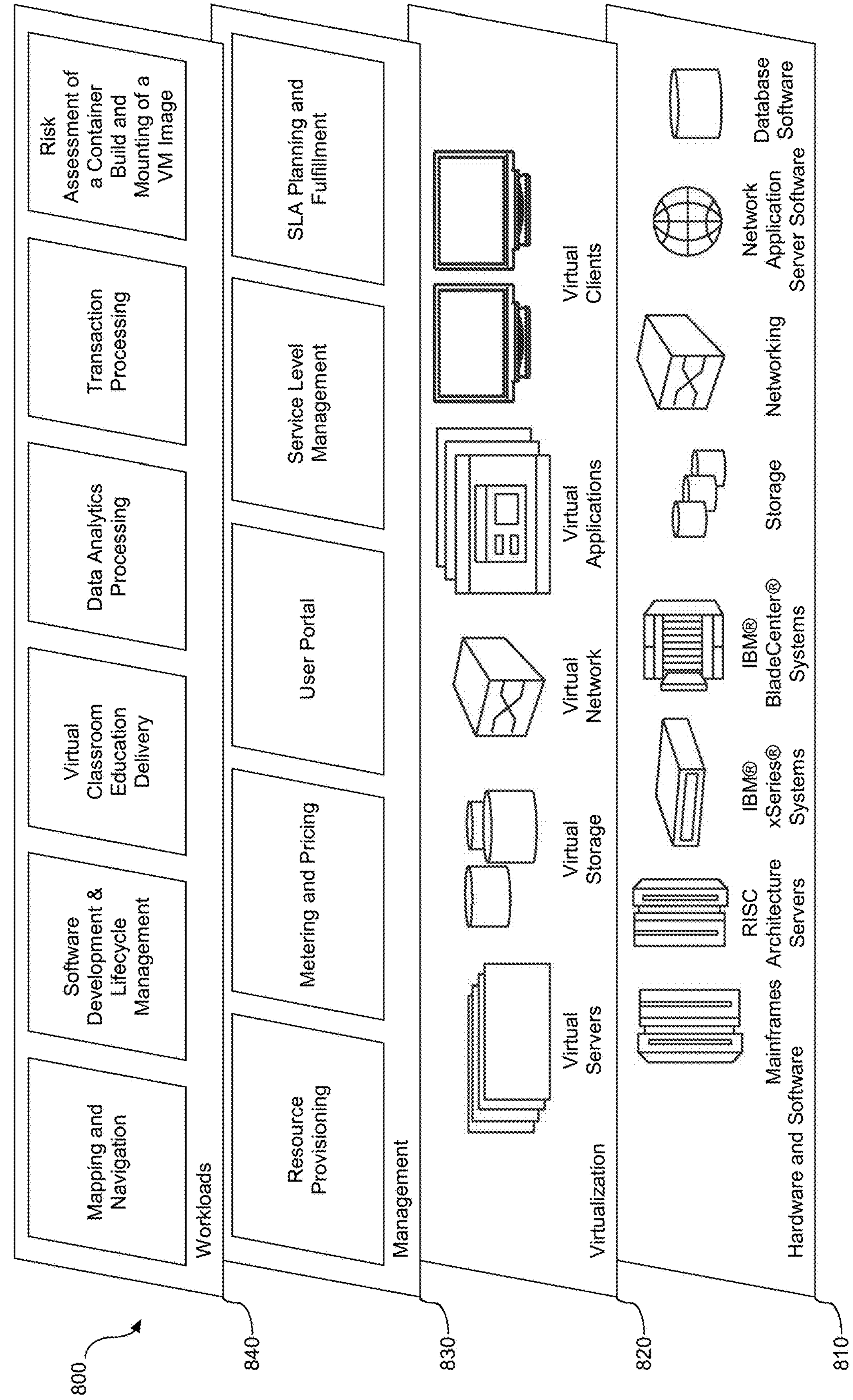
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides prearrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and risk assessment of a container build and mounting of a VM image.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of risk assessment of a container build.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, natural language processing may be carried out by different computing platforms or across multiple devices. Accordingly, the scope of protection of the embodiments is limited only by the following claims and their equivalents.

What is claimed is:

1. A computer system comprising:

a processor operatively coupled to memory;

an artificial intelligence (AI) platform in communication with the processor and memory, the AI platform comprising:

a representation manager configured to employ natural language processing (NLP) to convert a received metadata file representing a container or a virtual machine (VM) image into one or more vector representations;

a neural network manager configured to leverage a first artificial neural network (ANN) to assign a first score to each of the one or more vector representations, the first score to convey a compliance factor corresponding to operability of the one or more vector representations;

the neural network manager configured to selectively leverage a second ANN responsive to the first score assignment from the first ANN, the second ANN configured to assign a second score to the representation of the received metadata file, wherein the second score corresponds to a similarity factor with one or more compliant vector representations;

the neural network manager configured to selectively replace at least one of the vector representations of the received metadata file with at least one of the compliant vector representations responsive to the second score assignment; and the processor to selectively provision the container or the VM image with the selectively replaced one or more vector representations.

2. The computer system of claim 1, wherein the first score assignment further comprises the first ANN to measure a distance between a stored vector representation and the one or more vector representations of the received metadata file, and wherein the first score assignment is based on the measured distance.

3. The computer system of claim 2, further comprising responsive to the first score assignment, the second ANN configured to identify a stored compliant vector representation closest to the vector representation associated with the first score, and measure the distance between the identified stored compliant vector representation and the vector representation associated with the first score.

4. The computer system of claim 1, further comprising the representation manager to filter the received metadata file and remove noise from the metadata file prior to the conversion of the metadata file to the one or more vector representations.

5. The computer system of claim 4, wherein the filtered metadata file is comprised of container or VM layers of executable code.

6. The computer system of claim 5, wherein selectively replacing at least one of the vector representations further comprises the neural network manager to individually process remaining container or VM layers of executable code for compliance, and selectively and individually swap one or more of the remaining container or VM layers of executable code responsive to the individual processing.

7. A computer program product comprising:

a computer readable storage device; and program code embodied with the computer readable storage device, the program code executable by a processor to:

employ natural language processing (NLP) to convert a received metadata file representing a container or a virtual machine (VM) image into one or more vector representations;

leverage a first artificial neural network (ANN) to assign a first score to each of the one or more vector representations, the first score configured to convey a compliance factor corresponding to operability;

leverage a second ANN responsive to the first score assignment from the first ANN, the second ANN configured to assign a second score to a selective set of the one or more vector representations, the second score configured to convey a similarity factor with one or more compliant vector representations;

selectively replace at least one of the vector representations of the selective set with at least one of the compliant vector representations responsive to the second score assignment; and provision the container or the VM image containing the selectively replaced at least one vector representation.

8. The computer program product of claim 7, wherein assignment of the first score further comprises program code configured to leverage the first AAN to measure a distance between a stored vector representation and the one or more vector representations subject to the compliance factor conveyance, and wherein the first score assignment is based on the measured distance.

9. The computer program product of claim 8, further comprising responsive to the first score assignment, the second ANN configured to identify a stored compliant vector representation closest to the vector representation associated with the first score, and measure the distance between the identified stored compliant vector representation and the vector representation associated with the first score.

10. The computer program product of claim 7, further comprising program code configured to filter the received metadata file and remove noise from the metadata file prior to the conversion of the metadata file to the one or more vector representations.

11. The computer program product of claim 10, wherein the filtered metadata file is comprised of container or VM layers of executable code.

12. The computer program product of claim 11, wherein selectively replacing at least one of the vector representations further comprises program code configured to individually process remaining container or VM layers of executable code for compliance, and selectively and individually swap one or more of the remaining container or VM layers of executable code responsive to the processing.

13. A computer-implemented method comprising:

employing natural language processing (NLP), converting a received metadata file representing a container or a virtual machine (VM) image into one or more vector representations;

leveraging a first artificial neural network (ANN) to assign a first score to each of the one or more vector representations, the first score conveying a compliance factor corresponding to operability;

selectively leveraging a second ANN responsive to the first score assignment from the first ANN, the second ANN assigning a second score to each of the one or more vector representations, the second score conveying a similarity factor with one or more compliant vector representations; and selectively replacing at least one of the vector representations of the received metadata file with at least one of the compliant vector representations responsive to the second score assignment, and provisioning the container or the VM image received metadata file containing the selectively replaced at least one vector representation.

14. The computer-implemented method of claim 13, wherein assigning the first score further comprises the first ANN measuring a distance between a stored vector representation and the one or more vector representations subject to the provisioning, and wherein the first score assignment is based on the measured distance.

15. The computer-implemented method of claim 14, further comprising responsive to the first score assignment, the second ANN identifying a stored compliant vector representation closest to the vector representation associated with the first score, and measuring the distance between the identified stored compliant vector representation and the vector representation associated with the first score.

16. The computer-implemented method of claim 13, further comprising filtering the received metadata file and removing noise from the metadata file prior to the conversion of the metadata file to the one or more vector representations.

17. The computer-implemented method of claim 16, wherein the filtered metadata file is comprised of container or VM layers of executable code.

18. The computer-implemented method of claim 17, wherein selectively replacing at least one of the vector representations further comprises individually processing remaining container or VM layers of executable code for compliance, and selectively and individually swapping one or more of the remaining container or VM layers of executable code responsive to the processing.

* * * * *